United States Patent [19]

Baumgarten et al.

[11] Patent Number: 5,172,449
[45] Date of Patent: Dec. 22, 1992

[54] WINDSHIELD WIPER WITH INTEGRAL RESILIENT BIASING STRIP

[75] Inventors: Peter Baumgarten, Coburg; Bruno Egner-Walter, Heilbronn; Eckhardt Schmid, Brackenheim, all of Fed. Rep. of Germany

[73] Assignee: SWF Auto-Electric GmbH, Stuttgarter, Fed. Rep. of Germany

[21] Appl. No.: 573,228
[22] PCT Filed: Jan. 18, 1990
[86] PCT No.: PCT/EP90/00100
§ 371 Date: Sep. 20, 1990
§ 102(e) Date: Sep. 20, 1990
[87] PCT Pub. No.: WO90/08677
PCT Pub. Date: Aug. 9, 1990

[30] Foreign Application Priority Data

Jan. 27, 1989 [DE] Fed. Rep. of Germany ....... 3902397

[51] Int. Cl.⁵ .............. B60S 1/04; B60S 1/37
[52] U.S. Cl. ................ 15/250.42; 15/250.35
[58] Field of Search ........... 15/250.35, 250.42, 250.41, 15/250.36, 250.32, 250.31

[56] References Cited

U.S. PATENT DOCUMENTS

| 3,176,337 | 4/1965 | Glynn | 15/250.42 |
|---|---|---|---|
| 3,665,544 | 5/1972 | Sakamoto | 15/250.35 |
| 3,748,685 | 7/1973 | Edele et al. | 15/250.35 |
| 3,978,543 | 9/1976 | Tomlin | 15/250.42 |
| 4,095,308 | 6/1978 | Blaiklock | 15/250.42 |
| 4,187,576 | 2/1980 | Deibel | 15/250.42 |

FOREIGN PATENT DOCUMENTS

| 1938095 | 1/1971 | Fed. Rep. of Germany . |
| 2114102 | 3/1971 | Fed. Rep. of Germany . |
| 2311050 | 9/1974 | Fed. Rep. of Germany ... 15/250.42 |
| 2537474 | 3/1977 | Fed. Rep. of Germany . |
| 2638010 | 3/1978 | Fed. Rep. of Germany . |
| 3431936 | 3/1985 | Fed. Rep. of Germany . |
| 3527528 | 2/1987 | Fed. Rep. of Germany ... 15/250.42 |
| 1033521 | 7/1953 | France . |
| 2196618 | 3/1974 | France . |
| 2563481 | 10/1985 | France | 15/250.42 |
| 572184 | 1/1958 | Italy | 15/250.42 |
| 0683270 | 11/1952 | United Kingdom . |
| 0795075 | 5/1958 | United Kingdom . |
| 1078066 | 8/1967 | United Kingdom . |
| 2047523 | 12/1980 | United Kingdom . |
| 2157551 | 4/1984 | United Kingdom . |

*Primary Examiner*—Harvey C. Hornsby
*Assistant Examiner*—Gary K. Graham
*Attorney, Agent, or Firm*—Robert P. Seiter; J. Gordon Lewis

[57] ABSTRACT

A windshield wiper, especially for motor vehicle, is described comprising a carrier yoke, a rubber element, and a resilient support for the rubber element on the carrier yoke. The resilient support of the rubber element includes a resilient strip with several resilient lugs pointing in a first direction and at least one resilient lug pointing in a second direction opposite to the first direction. Thus, the rubber element is guided and resiliently supported on the carrier yoke at both ends.

28 Claims, 6 Drawing Sheets

WINDSHIELD WIPER WITH INTEGRAL RESILIENT BIASING STRIP

TECHNICAL FIELD

The present invention relates to a windshield wiper.

BACKGROUND OF THE INVENTION

Windshield wipers of this kind are known from the German patent No. 21 14 102 or from the German patent No. 34 31 936. In these windshield wipers a rigid carrier yoke is used, onto which a rubber element or a rail guiding this rubber element is supported via several resilient lugs spread in the longitudinal direction. In such a windshield wiper the conventional pressure spring between the linking member and the fastening member of the wiper arm in those windshield wipers mainly used in series nowadays can be avoided, and a carrier yoke system consisting of several yokes jointly mounted to each other is also unnecessary. Thus, with respect to inexpensive production, the windshield wipers of the sort disclosed may be advantageous. However, a wiping effect meeting all requirements in the whole wiping area has not been achieved.

SUMMARY OF THE INVENTION

Thus, the object of the present invention is to improve the wiping effect of the known wiper blades so that they are comparable with the windshield wipers normally produced in series nowadays, which windshield wipers comprise a system of several yokes mounted to each other in the form of a balance arm. Thereby the construction of the windshield wiper is as simple as possible so that the separate parts can be produced and mounted at low costs.

This object is achieved according to the present invention by providing, on a known windshield wiper with several resilient lugs pointing in a first direction, at least one resilient lug or one resilient element acting in the other direction. Thus the distribution of pressure along the rubber element can be substantially improved, particularly at the end. A resilient lug or a resilient element directly acts upon the end of the rubber element, whereas in the known wipers—as is made apparent in the drawings of the patents mentioned—an end of the rubber element is not guided and is not resiliently supported on the carrier yoke so that, especially with respect to curved windshields, the wiping effect is not satisfactory.

The object of the present invention can be realized in different ways. For instance, starting from the middle and progressing towards the end of the rubber element, the separate resilient lugs or resilient elements could be arranged in different directions. Thus the number of resilient lugs pointing in the first direction and the number of the resilient lugs pointing in the second direction would be the same in such an embodiment. However, an embodiment is preferred in which, apart from the resilient lugs pointing in the first direction, only one resilient lug points in the second direction and that resilient lug acts upon the end of the rubber element not otherwise affected.

It is not absolutely necessary that the resilient lugs or resilient elements be constructed in the same way. However, an especially advantageous embodiment is achieved when all the resilient lugs are integrally connected with each other and are preferably punched out from a steel resilient strip. All the elements for supporting the rubber element in a resilient way are integrally manufactured so that there are no difficulties with assembling them.

Theoretically the resilient lugs integrally connected with each other could directly engage the back of the rubber element or the rail guiding the rubber element. However, such a construction would not ensure a sufficiently lateral guide of the rubber element. Therefore, in a preferred embodiment, these resilient lugs each act upon a claw, whereby these claws guide and support the rubber element or the rail guiding the rubber element. In an especially preferred embodiment, the claws are part of a clawed yoke with each claw swivellable in relation to the carrier yoke. Each clawed yoke has bearing pins coaxially arranged and laterally protruding, which bearing pins engage respective bearing receivers on the carrier yoke. An embodiment is especially preferred in which these bearing pins engage elongated grooves on the carrier yoke, whereby the clawed yokes are prevented from moving in the longitudinal direction in relation to the carrier yoke by holding elements formed on the steel resilient strip. The advantage of such an embodiment is that the carrier yoke with its continual elongated grooves can be extruded from a plastic or pressed as a strip out of aluminum because of its constant cross-section. Thus the manufacturing costs can substantially be reduced. Punching out the apertures in the resilient strip forming the holding elements does not increase costs. Additional embodiments are possible in which each of these clawed yokes is directly mounted on bearing areas of the resilient strip through its bearing pins, and the resilient strip is fixed onto the carrier yoke in a manner which prevents movement in the longitudinal direction.

As to embodiments in which the resilient lugs act upon separate clawed yokes, at least one clawed yoke is arranged such that beginning at its linking point on the carrier yoke it points into a direction opposite most of the other clawed yokes. The arrangement of the clawed yokes in different directions can advantageously be used even when separate resilient elements for each clawed yoke are used instead of integrally forming the support for the rubber element. Moreover, in contrast to the known wipers, the area to be wiped is better swept when the end of the rubber element is guided by a clawed yoke which is arranged differently from that of the other clawed yokes, even if this clawed yoke is not resiliently supported on the carrier yoke.

There are several alternatives for mounting the adjacent clawed yokes which point in different directions. In a first embodiment, one of the clawed yokes is directly swivellably mounted on the other clawed yoke. Thus the separate clawed yokes must be formed differently. In another embodiment, the clawed yokes are, independently of each other, directly swivellably mounted on the carrier yoke and/or on the resilient strip appropriately formed. Although more space is needed, all the yokes can be manufactured in the same manner with the same tool. An embodiment is also possible in which a bearing pin of each clawed yoke is mounted in a bearing bore on the carrier yoke and another bearing pin is mounted in a bearing bore in another clawed yoke. The advantage of this embodiment is that little space is needed and all the clawed yokes are formed in the same way. In some embodiments, it is preferred that the two clawed yokes are linked to a joint pivot pin for reasons of stability.

BRIEF DESCRIPTION OF THE FIGURES

The invention and advantageous embodiments thereof are illustrated in the drawing of the embodiments in which.

DETAILED DESCRIPTION OF THE INVENTION

Figure 1:
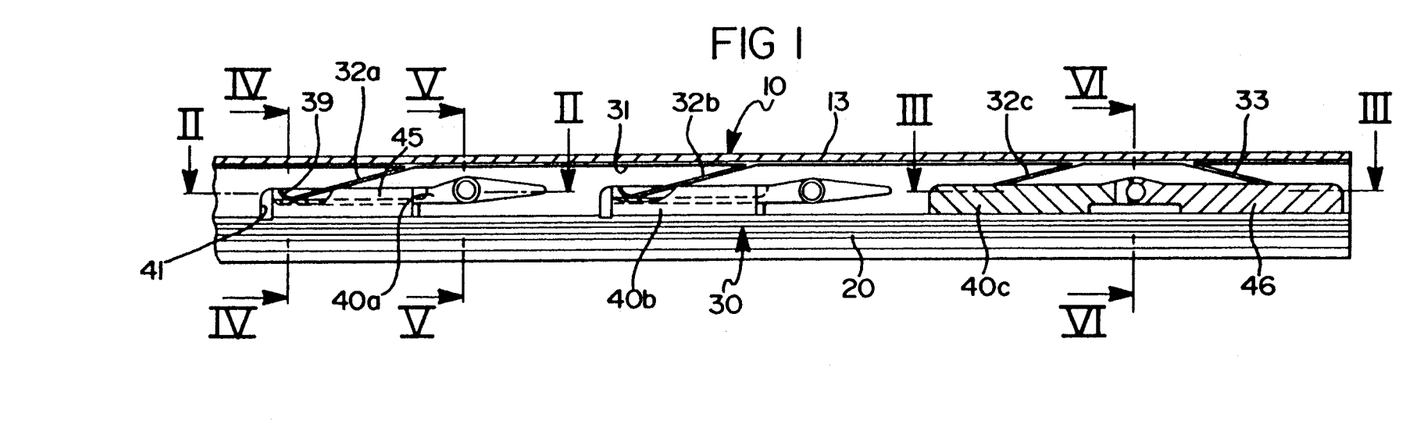
FIG. 1 is a partial longitudinal section of a windshield wiper.
Figure 4:
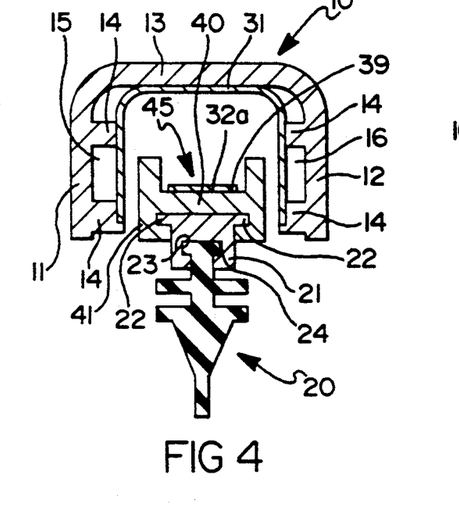
FIG. 4 is a cross-section taken along the line IV—IV in FIG. 1.

In FIG. 1 the carrier yoke of a windshield wiper is designated by 10, which—see FIG. 4—is of a substantially U-shaped cross-section with two side walls 11 and 12 and which includes a web 13 connecting these side walls. On the adjacent inner faces of these side walls 11 and 12, elongated grooves 15, 16, respectively, are formed by projecting strips 14. The function of elongated grooves 15, 16 is described hereinafter. This carrier yoke 10 is of the same cross-section along its whole length and is preferably extruded from plastic or pressed as a strip out of aluminum. When using appropriate materials in an appropriate dimension, a carrier yoke of a sufficiently stable form, but also of little weight, can be provided.

Furthermore, the windshield wiper includes a rubber element 20 which is made of an appropriate material, preferably in an extrusion process. In the embodiment shown in FIG. 4, this rubber element 20 is guided in a rail 21 sufficiently distributing the pressure exerted only at certain points. This rail 21 has flanges 22 laterally projecting and a receiving groove 23 for receiving a head 24 of the rubber element 20. Normally this rail 21 is made of plastic and is also manufactured in an extrusion process at low cost.

Finally, this windshield wiper also includes elements for supporting the rubber element 20 resiliently on the rigid carrier yoke 10. These elements are generally designated by 30. These support elements include a flexible strip made of steel, from which separate resilient lugs 32a, b, c are punched out, which resilient lugs 32a, b, c all point in the same direction, namely to the left in FIG. 1. Another resilient lug 33, however, points in the opposite direction, to the right in FIG. 1. Thus, these elements for supporting the rubber element 20 resiliently include, apart from the resilient lugs 32 pointing in a first direction, a resilient lug 33 which points in a second direction and acts upon an end of the rubber element 20. It is important that a resilient element acts upon the end of the rubber element. This element may be a resilient lug, but another resilient element can also be provided. A resilient element, for instance, can also be used which is a separate component regardless of the resilient lugs 32.

In a preferred embodiment the resilient element 33 pointing in the second direction acts upon the end of the rubber element 20 far from the drive. Thus the center of rotation for the windshield wiper shown in FIG. 1 is to the left of the resilient lug 32a. This arrangement is selected because the end of the rubber element, normally sweeping a curved windshield section, functions better when acted upon by a resilient element with an increased pressure force so that even at this end of the rubber element the wiping effect is good.

Furthermore, the elements for supporting the rubber element resiliently include clawed yokes 40 which are swivellably mounted in relation to the carrier yoke 10. These clawed yokes 40 have claws 41 at their free end, which claws grip the respective flange 22 on the rail 21 and which thus hook this rail 21 guiding the rubber element 20 and support it. At a distance from claws 41, these clawed yokes 40 have bearing pins 42 and 43 coaxially arranged to each other and laterally projecting. Bearing pins 42 and 43 engage the elongated grooves 15, 16 in the side walls 11, 12 of the carrier yoke 10. Thus these elongated grooves 15, 16 serve as bearing receivers for these clawed yokes 40.

However, the clawed yokes 40 must be prevented from moving in the longitudinal direction within these elongated grooves 15, 16. This is achieved by a special form of the flexible strip 31 which has a substantially U-shaped cross-section with two legs 34 and a back 35 connecting these legs. Bores or apertures 36 serving as holding elements are provided in these legs 34, into which these bearing pins 42, 43 engage.

Figure 2:
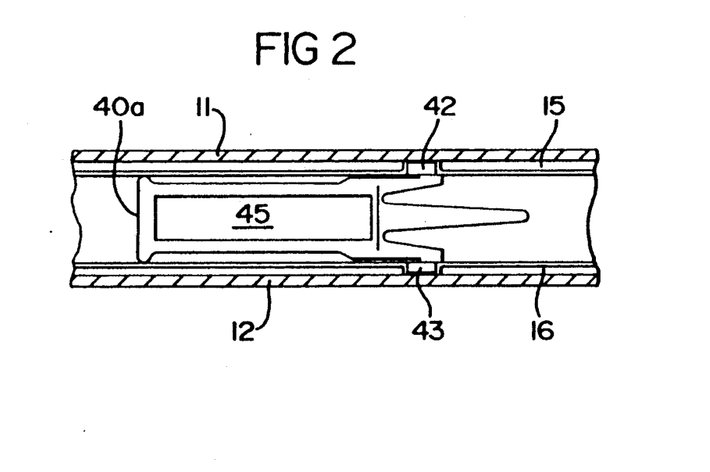
FIG. 2 is a section taken along the line II in FIG. 1.
Figure 3:
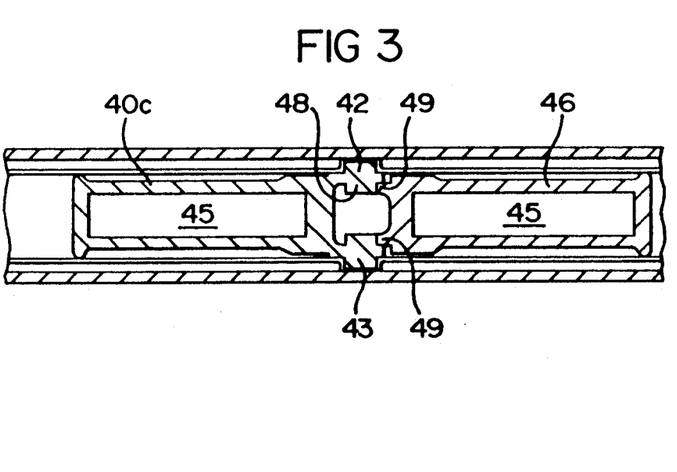
FIG. 3 is a section taken along the line III in FIG. 1.
Figure 5:
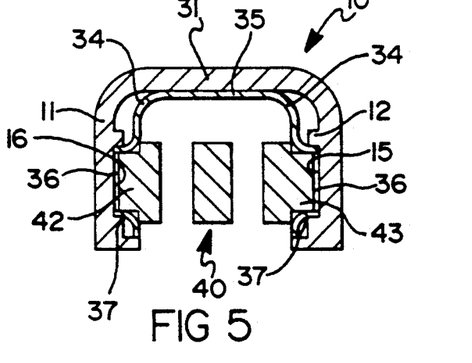
FIG. 5 is a cross-section taken along the line V—V in FIG. 1 without a rubber element.
Figure 6:
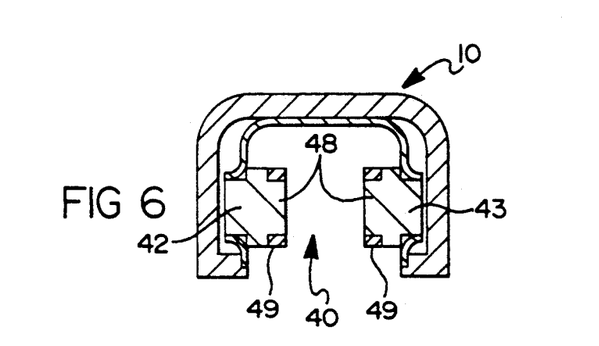
FIG. 6 is a cross section taken along the line VI—VI in FIG. 1 without a rubber element.
Figure 11:
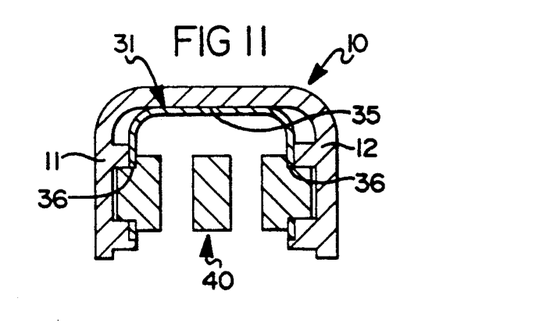
FIG. 11 is a cross-section similar to that of FIG. 5 showing another embodiment.

FIGS. 5 and 11 show different variants for mounting these clawed yokes 40. In the embodiment shown in FIG. 5, the closed aperture 36 is surrounded by a ring flange 37 so that the bearing area for the bearing pins 42, 43 is increased. In such an embodiment the clawed yokes 40 are mounted exclusively on the flexible strip 31, even if this ring flange 37 engages the elongated grooves 15, 16. In another embodiment as shown in FIG. 11 this ring flange 37 is missing and only the aperture 36 in the flexible strip 31 secures the clawed yokes 40 against moving in the longitudinal direction. Thus, these clawed yokes 40 are swivellably mounted on the carrier yoke 10 and/or on the flexible strip 31. As shown especially in FIG. 2, each clawed yoke 40 has a guiding receiver 45 into which the rounded end 39 of the respective resilient lug 32 engages. Due to this rounded end 39 the gliding friction and thus the abrasion at the point where the resilient lugs 32 and the clawed yoke 40 touch each other are reduced.

Figure 7:
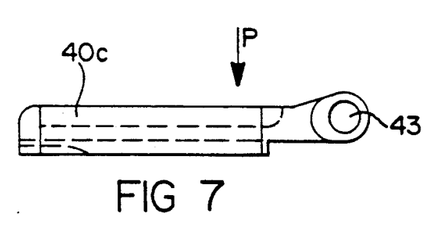
FIG. 7 is a lateral view of a clawed yoke.
Figure 8:
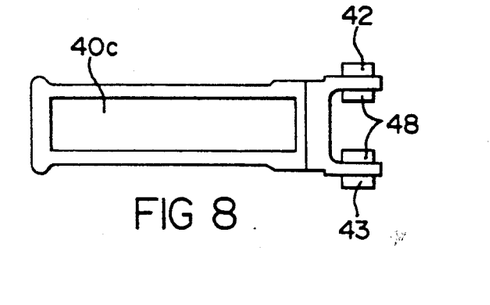
FIG. 8 is a view of FIG. 7 in the direction of Arrow P.
Figure 9:
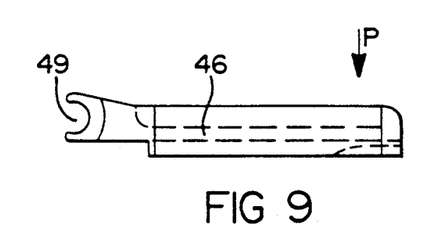
FIG. 9 is a view of another clawed yoke.
Figure 10:
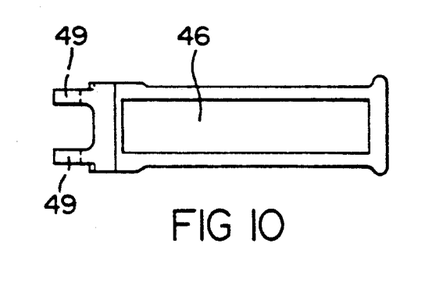
FIG. 10 is the respective view of FIG. 9 in the direction of Arrow P.

FIG. 1 makes clear that the wiper has several clawed yokes 40a, b, c which, beginning from their mounting point, all point in the same direction, i.e. in the direction of the resilient lugs 32. Furthermore this windshield wiper also includes a clawed yoke 46 which points in the opposite direction towards the end of the rubber element 20 and which is acted upon by the resilient lug 33. FIGS. 3 and 7 to 10 explain how this clawed yoke 46 is mounted. FIGS. 7 and 8 show that, apart from the bearing pins 42, 43 for mounting the clawed yoke 40c on the carrier yoke 10, clawed yoke 40c has further bearing pins 48. For this purpose the adjacent clawed yoke 46 has respective mouth-like bearing receivers 49 which can be snapped onto these bearing pins 48. Thus in this embodiment the clawed yoke 46 pointing in the second direction is directly mounted onto the adjacent clawed yoke 40c pointing in the first direction.

Figure 12:
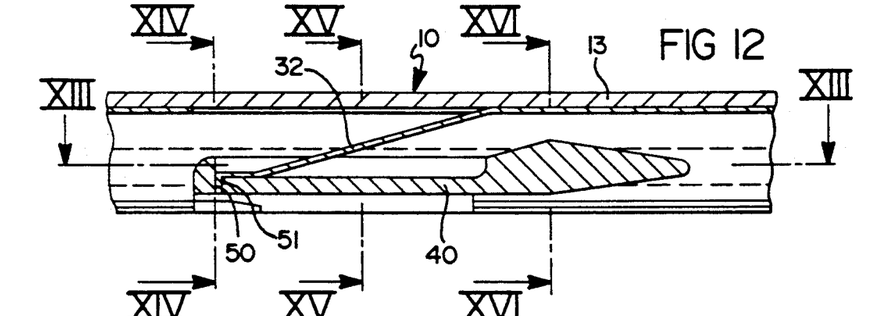
FIG. 12 is a partial longitudinal section of another windshield wiper.
Figure 13:
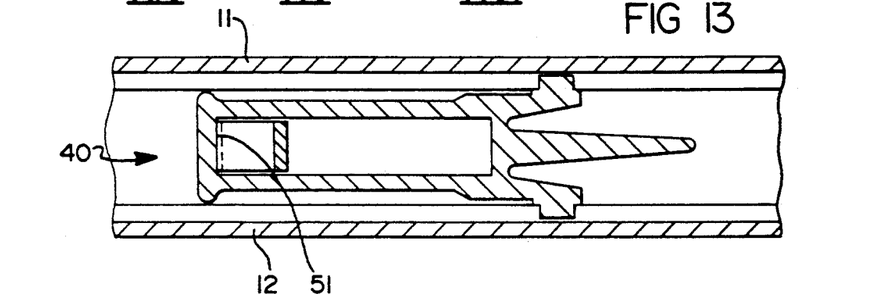
FIG. 13 is a section taken along the line XIII in FIG. 12.
Figure 14:
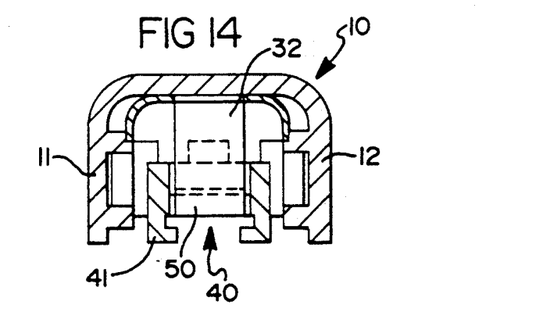
FIG. 14 is a cross-section taken along the line XIV—XIV in FIG. 12.
Figure 15:
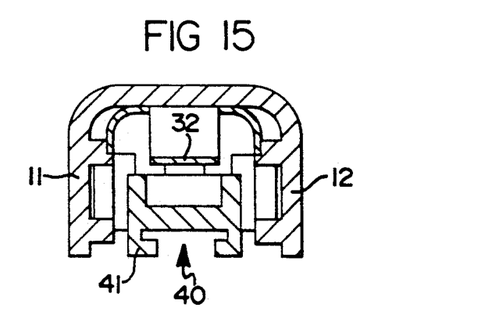
FIG. 15 is a cross-section taken along the line XV—XV in FIG. 12.
Figure 16:
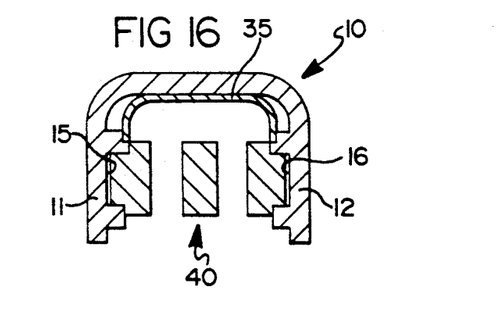
FIG. 16 is a cross-section taken along the line XVI—XVI in FIG. 12.
Figure 17:
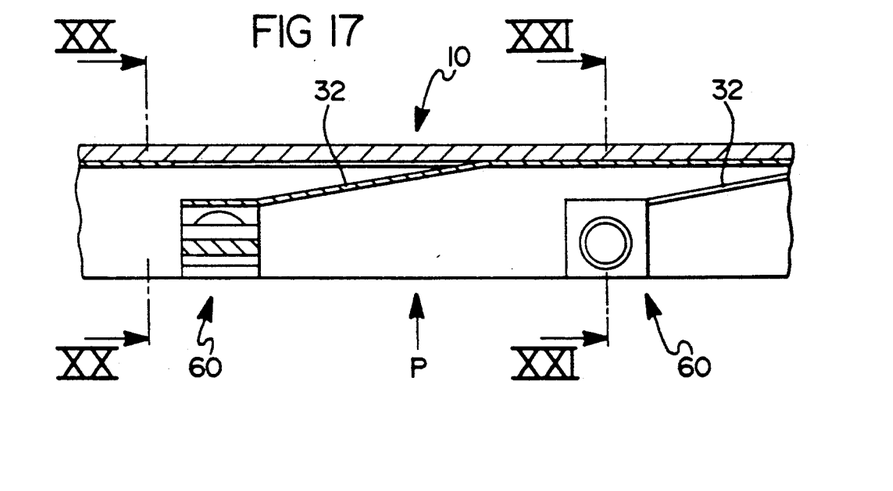
FIG. 17 is a partial longitudinal section of another embodiment of a windshield wiper.
Figure 18:
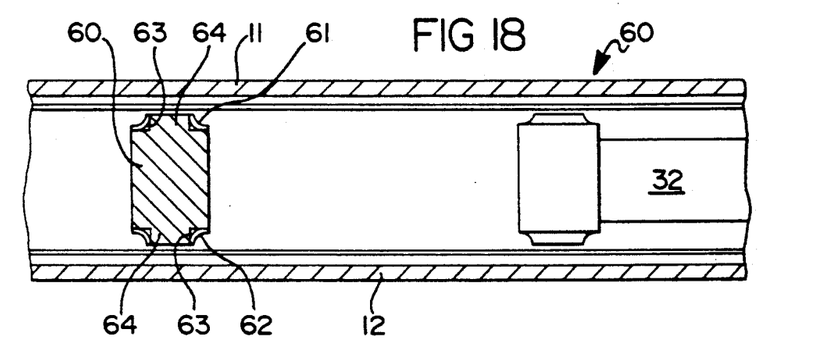
FIG. 18 is a view of FIG. 17 in the direction of Arrow P.

The embodiment shown in FIGS. 12 to 16 substantially differs from the embodiment described above in that the separate clawed yokes 40 are secured against moving in the longitudinal direction in relation to the carrier yoke 10 by a strap 50. Each strap 50 serves as a holding element which is deflected at the end of each resilient lug 32 and engages a slot 51 formed correspondingly on the respective clawed yoke 40. In this embodiment the clawed yoke 40 is supported and mounted on the elongated grooves 15, 16. In this embodiment the flexible strip 31 has no bearing function. In this embodiment, as shown in FIG. 12, movement is prevented by the end of the resilient lug 32 where the resilient lug 32 contacts the clawed yoke 40.

Figure 19:
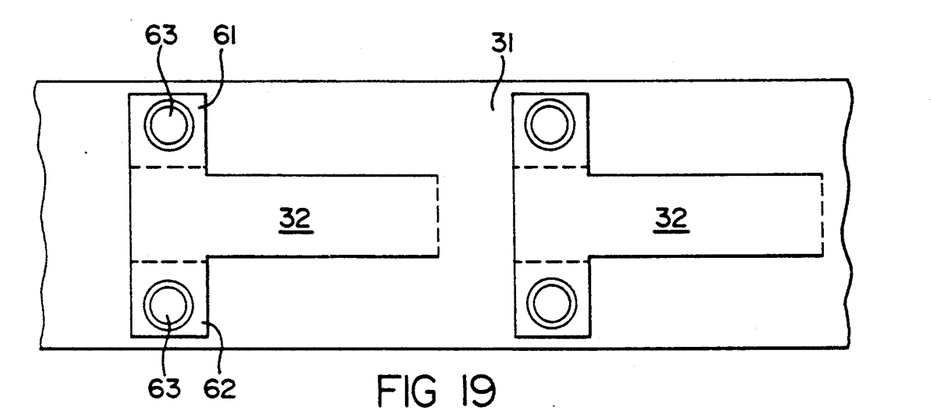
FIG. 19 is a view of a resilient strip for windshield wipers as shown in FIGS. 17 and 18.
Figure 20:
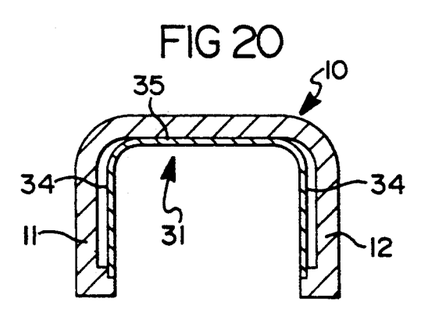
FIG. 20 is a cross-section taken along the line XX—XX in FIG. 17.
Figure 21:
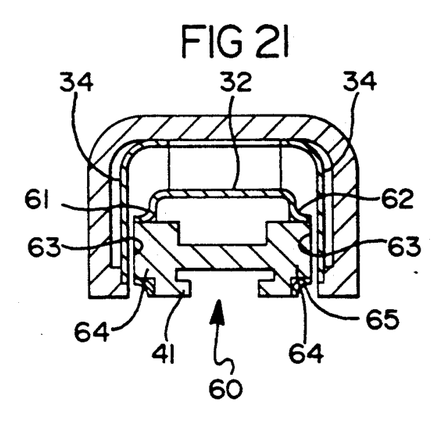
FIG. 21 is a cross-section taken along the line XXI—XXI in FIG. 17.

The embodiment shown in FIGS. 17 to 21 principally differs from the embodiments described so far in that longer clawed yokes 40 are not used, which clawed yokes 40 are supported or mounted on the carrier yoke 10; instead, single claws 60 are indirectly swivellably mounted on the end of the separate resilient lugs 32. For this purpose each resilient lug 32 has an end having a U-shaped cross-section. Bearing bores 63 coaxially arranged to each other are provided in the legs 61, 62, into which bearing bores 63 the bearing pins 64 of the single claws 60 respectively engage. Thereby the bearing bores 63 can be surrounded by a ring flange 65 for increasing the bearing area. FIG. 20 shows that the flexible strip 31, deflected at least in sections in the shape of a "U," is snapped onto the U-shaped carrier yoke 10 and is held by undercuts on the side walls 11, 12. FIG. 19 is a view of the flexible strip 31 before the legs 61 and 62 are deflected at the ends of the resilient lugs 32. These figures also make clear that all the resilient lugs 32 are integrally connected with each other.

Figure 22:
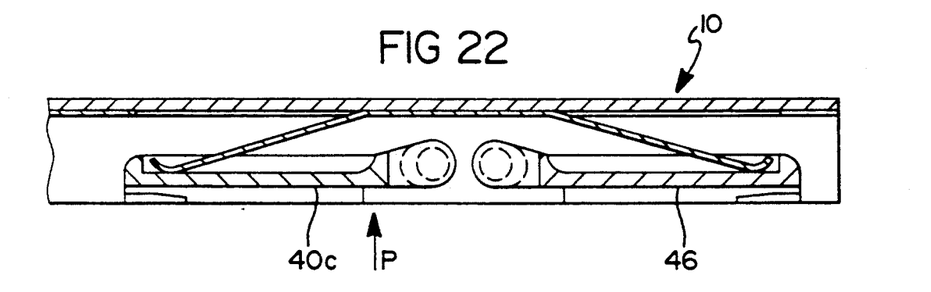
FIG. 22 is a partial longitudinal section of another embodiment of a windshield wiper.
Figure 23:
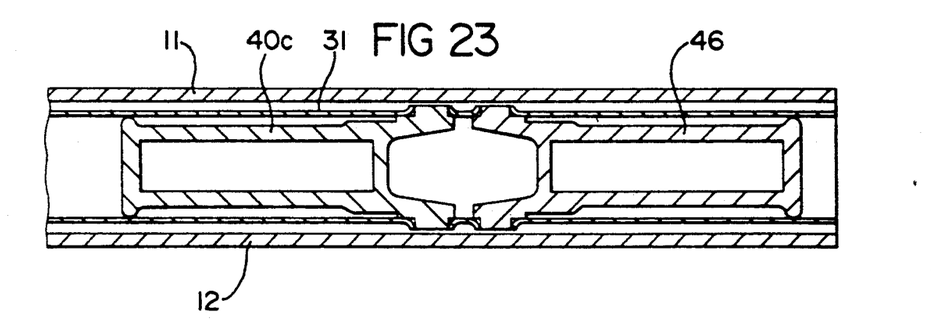
FIG. 23 is a view of FIG. 22 in the direction of Arrow P.

FIGS. 22 and 23 illustrate an embodiment in which the adjacent clawed yokes 40c and 46 pointing into different directions are each separately mounted on the carrier yoke 10 and/or on the flexible strip 31. Thus, the way the yoke 40c is mounted corresponds to the embodiment shown in FIGS. 1, 3 and the adjacent clawed yoke 46 pointing in the second direction is mounted in the same way. Thus in such an embodiment the same clawed yokes can be used regardless of the direction of the assembly.

Figure 24:
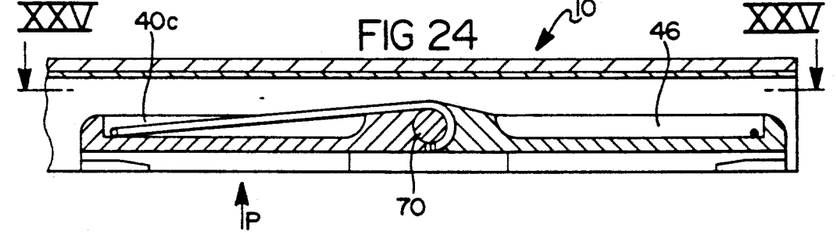
FIG. 24 is a partial longitudinal section of another embodiment of a windshield wiper.
Figure 25:
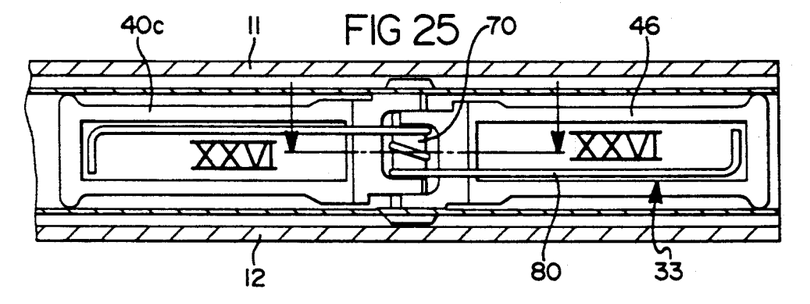
FIG. 25 is a section taken along the line XXV—XXV in FIG. 24.
Figures 26, 27, 28:
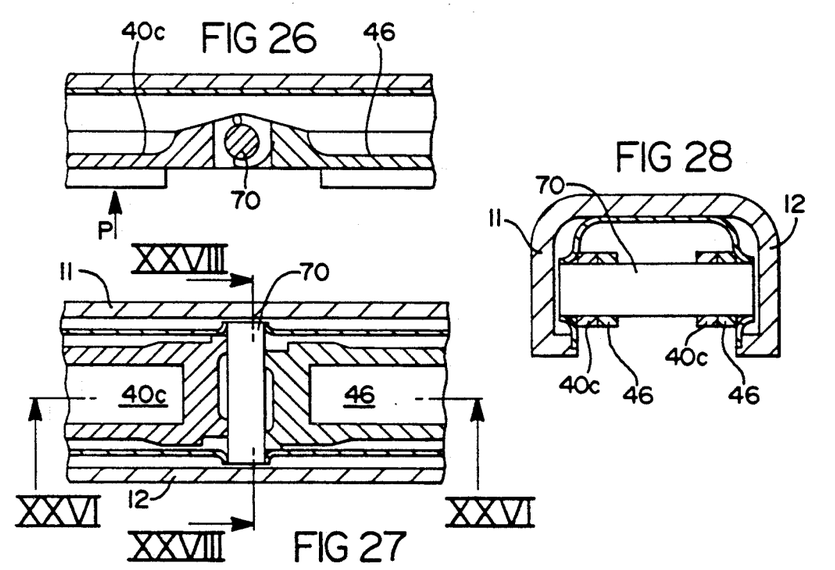
FIG. 26 is a partial section taken along the line XXVI—XXVI in FIG. 25.
FIG. 27 is a view of FIG. 26 in the direction of Arrow P.
FIG. 28 is a cross-section taken along the line XXVIII—XXVIII in FIG. 27.

Finally, in FIGS. 24 to 28, a further embodiment is illustrated in which the adjacent clawed yokes 40c, 46 pointing in opposite directions are both swivellably mounted on an additional pivot or bearing pin 70. As shown especially in FIGS. 25 and 27, both clawed yokes 40c, 46 can be designed in the same way again regardless of the direction of the assembly by laterally displacing the mouth-like bearing receivers 49 on the clawed yokes 40c or 46. FIGS. 24, 25 also show an embodiment in which the resilient element 33 acting in the second direction is formed as a leg spring 80 regardless of the resilient lugs. This leg spring 80 may have only one leg, but an embodiment including a leg spring of two legs is preferred, whereby the other leg acts upon the adjacent clawed yoke 40c. Thus this leg spring 80 acts in different directions of rotation on two clawed yokes arranged into opposite directions and mounted at the same bearing point. Moreover, the windshield wiper can have resilient lugs similar to the embodiment shown in FIG. 1. However, embodiments are also possible in which other clawed yokes are combined in pairs and are resiliently supported on each other via a leg spring of two legs.

What is claimed is:

1. A windshield wiper for motor vehicles comprising:
   a carrier yoke;
   a rubber element; and
   means for resiliently supporting said rubber element on said carrier yoke to distribute pressure along said rubber element and including:
   a plurality of clawed yokes each swivellably mounted at its top on said carrier yoke and each having at its bottom a claw for carrying said rubber element,
   a flexible strip attached to said carrier yoke,
   a plurality of elongated resilient lugs integrally connected to and formed from said flexible strip, said resilient lugs disposed along said strip and each of said resilient lugs having an end extending from said strip in a first direction, and
   at least one elongated resilient element integrally connected to and formed from said flexible strip, said resilient element having an end extending from said strip in a second direction opposite said first direction,
   each of said resilient lugs and said at least one resilient element engaging a separate one of said clawed yokes adjacent said claw.

2. A windshield wiper as claimed in claim 1 further comprising a single resilient element extending from said strip in said second direction, said resilient element acting upon an end of said rubber element.

3. A windshield wiper as claimed in claim 1 wherein said at least one resilient element is a resilient lug.

4. A windshield wiper as claimed in claim 3 wherein said ends of said resilient lugs are rounded.

5. A windshield wiper as claimed in claim 3 wherein said clawed yokes have guiding receivers and said end of each said resilient lug engages one of said guiding receivers.

6. A windshield wiper as claimed in claim 3 wherein said resilient lugs are disposed along said strip so that the distribution of pressure along said rubber element is predetermined.

7. A windshield wiper as claimed in claim 3 wherein said flexible strip is steel.

8. A windshield wiper as claimed in claim 1 wherein at least one of said resilient lugs is formed as a leg spring.

9. A windshield wiper as claimed in claim 1 wherein said support means further includes a rail for guiding and supporting said rubber element, wherein said claws grip said rail.

10. A windshield wiper as claimed in claim 1 wherein said support means further includes a pair of bearing pins coaxially disposed and laterally projecting from each of said clawed yokes, said bearing pins engaging corresponding bearing receivers formed on said carrier yoke.

11. A windshield wiper as claimed in claim 10 wherein:
said carrier yoke has an approximately U-shaped cross-section having a first side wall and a second side wall, each said side wall including a groove extending along the entire length of said side wall, and a web connecting said first side wall to said second side wall;
said bearing pins of said clawed yokes engage said grooves of said side walls of said carrier yoke; and
said flexible strip includes holding elements preventing said clawed yokes from longitudinal movement relative to said carrier yoke.

12. A windshield wiper as claimed in claim 11 wherein said flexible strip includes an approximately U-shaped cross-section along at least part of its length including a first leg and a second leg, each said leg having an aperture engaging one of said bearing pins of said clawed yokes, and a back connecting said first leg to said second leg.

13. A windshield wiper as claimed in claim 1 wherein said support means further includes a pair of bearing pins coaxially disposed and laterally projecting from each of said clawed yokes, said bearing pins engaging corresponding apertures formed on said flexible strip.

14. A windshield wiper as claimed in claim 13 wherein said support means further includes a ring flange surrounding each said aperture formed on said flexible strip, said ring flange providing a bearing area for said bearing pins of said clawed yokes.

15. A windshield wiper as claimed in claim 1 wherein said support means further includes a plurality of bent straps on said flexible strip, each said strap engaging a slot formed on each said clawed yoke.

16. A windshield wiper as claimed in claim 1 wherein:
said flexible strip includes an end having a U-shaped cross-section having a first leg and a second leg, each said leg having a bearing bore coaxially disposed relative to said bearing bore of the opposite leg, and a back connecting said first leg to said second leg;
each of said claws includes a pair of bearing pins; and
said bearing pins of said claws swivellably mount in said bearing bores of said legs of said flexible strip.

17. A windshield wiper as claimed in claim 1 wherein at least one clawed yoke extends from its top in said second direction and the remaining clawed yokes extend from their tops in said first direction opposite said second direction.

18. A windshield wiper as claimed in claim 17 wherein each said clawed yoke pointing in a second direction is mounted to one of said clawed yokes pointing in a first direction.

19. A windshield wiper as claimed in claim 17 wherein said at least one clawed yoke extending in a second direction is swivellably mounted directly on said carrier yoke and on said flexible strip.

20. A windshield wiper as claimed in claim 17 wherein said at least one clawed yoke extending in a second direction is swivellably mounted directly on said flexible strip.

21. A windshield wiper as claimed in claim 17 wherein one of said remaining clawed yokes has a first bearing pin mounted in a first bearing bore formed in said carrier yoke and a second bearing pin mounted in a bearing receiver formed in said at least one clawed yoke.

22. A windshield wiper as claimed in claim 17 wherein said support means further includes a pivot pin fixed into bores formed on said flexible strip and on said carrier yoke, and adjacent clawed yokes pointing in opposite directions are commonly linked to said pivot pin.

23. A windshield wiper as claimed in claim 17 wherein said support means further includes a pivot pin fixed into bores formed on said carrier yoke, and adjacent clawed yokes pointing in opposite directions are commonly linked to said pivot pin.

24. A windshield wiper as claimed in claim 1 wherein the ends of said resilient lugs are rounded.

25. A windshield wiper as claimed in claim 1 wherein said clawed yokes have guiding receivers and the end of each said flexible lug engages one of said guiding receivers.

26. A windshield wiper as claimed in claim 1 wherein said at least one resilient element is formed as a leg spring.

27. A windshield wiper as claimed in claim 26 wherein:
(a) at least one clawed yoke extends from its top in said second direction and the remaining clawed yokes extend from their tops in said first direction opposite said second direction;
(b) said at least one clawed yoke extending in said second direction and the adjacent clawed yoke extending in said first direction are mounted at a common point on said carrier yoke; and
(c) said leg spring has two legs, one leg engaging said at least one clawed yoke extending in said second direction and the second leg engaging the adjacent clawed yoke extending in said first direction so that the legs of said leg spring act in opposite directions of rotation.

28. A windshield wiper as claimed in claim 1 wherein said resilient lugs and said at least one resilient element are disposed along said strip so that the distribution of pressure along said rubber element is predetermined.

* * * * *